US012764349B2

(12) United States Patent
Yang et al.

(10) Patent No.: US 12,764,349 B2
(45) Date of Patent: Oct. 13, 2026

(54) MEDIA CONTROL METHOD AND VEHICLE-MOUNTED TERMINAL

(71) Applicant: BYD COMPANY LIMITED, Shenzhen (CN)

(72) Inventors: Shikun Yang, Shenzhen (CN); Ke Liu, Shenzhen (CN); Jiande Zhang, Shenzhen (CN); Zhou Ruan, Shenzhen (CN); Zetong Chen, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 3 days.

(21) Appl. No.: 18/974,621

(22) Filed: Dec. 9, 2024

(65) Prior Publication Data

US 2025/0106447 A1 Mar. 27, 2025

Related U.S. Application Data

(63) Continuation of application No. PCT/CN2023/077656, filed on Feb. 22, 2023.

(30) Foreign Application Priority Data

Jun. 21, 2022 (CN) ........................ 202210723009.X
Oct. 13, 2022 (CN) ........................ 202211256021.0

(51) Int. Cl.
*H04N 21/232* (2011.01)
*G06F 8/61* (2018.01)
*H04N 21/482* (2011.01)

(52) U.S. Cl.
CPC ............ *H04N 21/232* (2013.01); *G06F 8/61* (2013.01); *H04N 21/482* (2013.01)

(58) Field of Classification Search
CPC ............... H04N 21/232; H04N 21/482; H04N 21/262; H04N 21/414; H04N 21/443;
(Continued)

(56) References Cited

U.S. PATENT DOCUMENTS

2012/0233640 A1 9/2012 Odryna et al.
2012/0278844 A1* 11/2012 Curtis .................. H04N 21/20
(Continued)

FOREIGN PATENT DOCUMENTS

CN 101452727 B 7/2011
CN 101180619 B 5/2012
(Continued)

OTHER PUBLICATIONS

International Search Report and Written Opinion for Application No. PCT/CN2023/077656, mailed on Jun. 21, 2023, 8 pages.
(Continued)

*Primary Examiner* — Anthony Bantamoi
(74) *Attorney, Agent, or Firm* — Sheppard Mullin Richter & Hampton LLP

(57) ABSTRACT

A media control method is applied to a first fusion media application system. The media control method includes: determining target content from a target media source, and obtaining a content identifier of the target content and a media source identifier of the target media source; obtaining a target interface corresponding to the media source identifier, and obtaining a target media server of the target media source; and obtaining the target content from the target media server based on the content identifier through the target interface.

17 Claims, 8 Drawing Sheets

(58) Field of Classification Search
CPC .......... H04N 21/41422; H04N 21/4828; G06F 8/61; G06F 3/0482; G06F 3/0487; G06F 9/451; G06F 16/43; G06F 16/435; B60R 16/023
See application file for complete search history.

(56) References Cited

U.S. PATENT DOCUMENTS

| | | | |
|---|---|---|---|
| 2014/0196079 A1* | 7/2014 | Jannard ............ | H04N 21/22613 |
| 2015/0046939 A1* | 2/2015 | Oliver ................ | H04N 21/4627 |
| 2016/0080815 A1 | 3/2016 | Ruffini et al. | |
| 2016/0088052 A1 | 3/2016 | Juzswik et al. | |
| 2016/0328396 A1 | 11/2016 | Rajapakse | |
| 2018/0234364 A1 | 8/2018 | Gong et al. | |
| 2019/0342358 A1 | 11/2019 | Barvesten et al. | |
| 2020/0142661 A1* | 5/2020 | Cansino ............. | H04N 21/4126 |
| 2022/0159343 A1 | 5/2022 | Andries et al. | |

FOREIGN PATENT DOCUMENTS

| | | | |
|---|---|---|---|
| CN | 202231848 | U | 5/2012 |
| CN | 202364391 | U | 8/2012 |
| CN | 102724309 | A | 10/2012 |
| CN | 102843431 | A | 12/2012 |
| CN | 104169865 | A | 11/2014 |
| CN | 104797001 | A | 7/2015 |
| CN | 204596423 | U | 8/2015 |
| CN | 204623329 | U | 9/2015 |
| CN | 102884522 | B | 5/2016 |
| CN | 106790335 | A | 5/2017 |
| CN | 206506634 | U | 9/2017 |
| CN | 112182411 | A | 1/2021 |
| CN | 112463747 | A | 3/2021 |
| CN | 113163263 | A | 7/2021 |
| CN | 113377324 | A | 9/2021 |
| CN | 114065026 | A | 2/2022 |
| GB | 2596110 | A | 12/2021 |

OTHER PUBLICATIONS

Extended European Search Report dated Jun. 20, 2025, issued in European Patent Application No. 23825799.2 (9 pages).
Notice of Reasons for Refusal dated Sep. 2, 2025, issued in Japanese Patent Application No. 2024-575363, with English machine translation (11 pages).

* cited by examiner

MEDIA CONTROL METHOD AND VEHICLE-MOUNTED TERMINAL

CROSS-REFERENCE TO RELATED APPLICATIONS

This application is a continuation application of International Patent Application No. PCT/CN2023/077656, filed on Feb. 22, 2023, which is based on and claims priority to and benefits of Chinese Patent Application No. 202210723009.X, filed on Jun. 21, 2022, and Chinese Patent Application No. 202211256021.0, filed on Oct. 13, 2022. The entire content of all of the above-referenced applications is incorporated herein by reference.

TECHNICAL FIELD

Embodiments of the present disclosure relate to the field of software control, and in particular, to a media control method and a vehicle-mounted terminal.

BACKGROUND

In related arts, to implement multiple different vehicle-mounted functions, multiple applications need to be installed on a vehicle-mounted terminal. Media applications of different types are installed on an existing vehicle-mounted terminal, and multiple media applications of a same type may coexist. Because music resources available to each media application are different, a user needs to switch between different media applications to obtain an expected music resource. Consequently, convenience in user operation is greatly reduced.

SUMMARY

Embodiments of the present disclosure is to provide a media control method, a vehicle-mounted terminal, a storage medium, and a computer program product, to help a user obtain content resources from different media sources.

According to a first aspect of the present disclosure, a media control method is provided, which is applied to a first converged media application system. The media control method comprises: determining target content from a target media source, and obtaining a content identifier of the target content and a media source identifier of the target media source; obtaining a target interface corresponding to the media source identifier, and obtaining a target media server of the target media source; and obtaining the target content from the target media server based on the content identifier through the target interface.

In an embodiment, before the content identifier of the target content and the media source identifier of the target media source are obtained, the method further includes: in response to a first input of a user, determining the target media source in the multiple media sources; displaying a content list of the target media source; and in response to a second input of the user, determining the target content from the content list.

In an embodiment, before the content identifier of the target content and the media source identifier of the target media source are obtained, the method further includes: in response to a first input of a user, determining the target media source in the multiple media sources; receiving a search keyword entered by the user in a search window; submitting, to the target media server through the target interface, a search request comprising the search keyword, and receiving a search result corresponding to the search keyword from the target media server; and in response to a third input of the user, determining the target content in the search result.

In an embodiment, before the content identifier of the target content and the media source identifier of the target media source are obtained, the method further includes: receiving a search keyword entered by a user in a converged search window; submitting, to a media server of each of the media sources through an interface of each of the media sources, a search request comprising the search keyword, and receiving a search result corresponding to the search keyword from the media server of each of the media sources; and in response to a third input of the user, determining the target content in the search results.

In an embodiment, that a content identifier of target content and a media source identifier of a target media source are obtained includes:

- obtaining push information in a target account from a server end after the target account is logged in; and obtaining the content identifier of the target content and the media source identifier of the target media source from the push information.

In an embodiment, the push information is generated by the server end based on the content identifier of the target content and the media source identifier of the target media source that are submitted by a second media application system to which the target account is logged in on the second media application system. The first converged media application system is installed on a vehicle-mounted terminal, and the second media application system is installed on a mobile terminal.

In an embodiment, the first converged media application system is installed on a vehicle-mounted terminal or on a mobile terminal.

In an embodiment, the interface of each of the media sources comprises a Software Development Kit (SDK) interface or an Application Programming Interface (API).

According to a second aspect of the present disclosure, a media control method is further provided, which is applied to a second media application system. The media control method includes: A content identifier of target content and a media source identifier of a target media source are sent to a server end, so that the server end delivers push information to a first converged media application system. Interfaces of multiple media sources are integrated in the first converged media application system. The push information includes the content identifier of the target content and the media source identifier of the target media source, so that the first converged media application system obtains the target content from a target media server based on the content identifier through a target interface of the first converged media application system. The target interface corresponds to the media source identifier, and the target media server is a media server of the target media source.

In an embodiment, interfaces of multiple media sources are integrated in the second media application system. Before the content identifier of the target content and the media source identifier of the target media source are sent to the server end, the method further includes: receiving a search keyword entered by a user in a converged search window of the second media application system; submitting, to a media server of each of the media sources of the second media application system through an interface of each of the media sources, a search request comprising the search keyword, and receiving a search result corresponding to the search keyword from the media server of each of the media sources; and in response to a third input of the user, determining the target content in the search results.

In an embodiment, the first converged media application system is installed on a vehicle-mounted terminal and the second media application system is installed on a mobile terminal, or the first converged media application system is installed on a mobile terminal and the second media application system is installed on a vehicle-mounted terminal.

According to a third aspect of the present disclosure, a media control method is further provided. The second media application system sends a content identifier of target content and a media source identifier of a target media source to the server end. The server end delivers push information to the first converged media application system. The first converged media application system obtains the content identifier of the target content and the media source identifier of the target media source from the push information. The first converged media application system obtains the target content from a target media server based on the content identifier through a target interface. The target interface is of the first converged media application system, corresponding to the media source identifier, and the target media server is a media server of the target media source.

In an embodiment, interfaces of multiple media sources are integrated in the second media application system. Before the second media application system sends the content identifier of the target content and the media source identifier of the target media source to the server end, the method further includes: receiving, by the second media application system, a search keyword entered by a user in a converged search window of the second media application system; submitting, by the second media application system to a media server of each of the media sources of the second media application system through an interface of each of the media sources, a search request comprising the search keyword, and receiving a search result corresponding to the search keyword from the media server of each of the media sources; and in response to a third input of the user, determining, by the second media application system, the target content in the search results.

The present disclosure provides a media control method applied to a first converged media application system. The first converged media application system can be used to access different media sources to obtain content for playback, and media applications corresponding to these media sources do not need to be installed on the converged media application system one by one. In this way, it is convenient for a user to use and operate, and user experience is improved.

Other features and advantages of the present disclosure are to become clear in the following detailed descriptions of embodiments of the present disclosure with reference to accompany drawings.

BRIEF DESCRIPTION OF DRAWINGS

Accompanying drawings are incorporated into and constitute a part of this specification, show embodiments of the present disclosure, and are used together with descriptions of the accompany drawings to describe a principle of the present disclosure.

DESCRIPTION OF EMBODIMENTS

Various embodiments of the present disclosure are now described in detail with reference to accompanying drawings. It should be noted that, unless otherwise specified, opposite arrangements, numerical expressions, and numerical values of components and steps described in the embodiments do not limit the scope of the present disclosure.

The following descriptions of at least one embodiment are merely illustrative, and in no way constitute any limitation on the present disclosure and application or use of the present disclosure.

Technologies, methods, and devices known to persons of ordinary skill in related arts may not be discussed in detail, but the technologies, the methods, and the devices should be considered as a part of this specification in appropriate circumstances.

In all examples shown and discussed herein, any value should be merely examples and not to be a limitation. Therefore, other examples of embodiments may have different values.

It should be noted that, similar labels and letters indicate similar items in the following accompanying drawings. Therefore, once an item is defined in one accompanying drawing, the item does not need to be further discussed in subsequent accompanying drawings.

Figure 2:
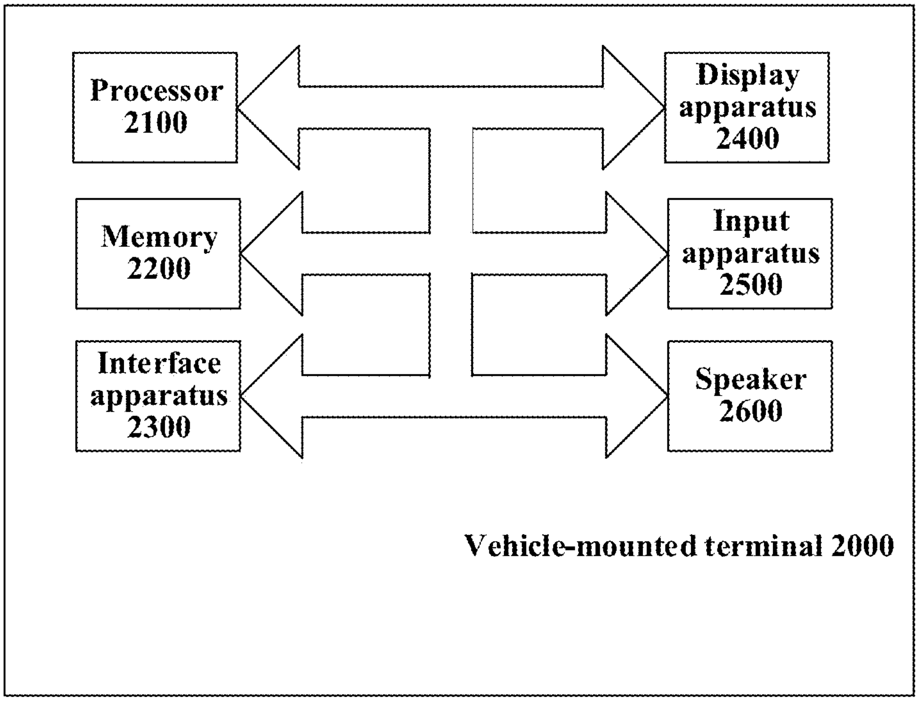
FIG. 2 is a diagram of a structure of a hardware configuration of a vehicle-mounted terminal that can be used to implement an embodiment.

FIG. 2 is a diagram of a structure of a hardware configuration of a vehicle-mounted terminal 2000 to which a media control method in embodiments of the present disclosure is applicable.

As shown in FIG. 2, the vehicle-mounted terminal 2000 may include a processor 2100, a memory 2200, an interface apparatus 2300, a display apparatus 2400, an input apparatus 2500, a speaker 2600, and the like. The processor 2100 is configured to execute a computer program. The computer program may use an instruction set of an architecture, for example, x86, Arm, RISC, MIPS, or SSE. The memory 2200 includes, for example, a ROM (read-only memory), a RAM (random access memory), and a non-volatile memory such as a hard disk. The interface apparatus 2300 is a physical interface, for example, a USB interface or a headset jack. The display apparatus 2400 may be a display, and the display may be a touchscreen. The input apparatus 2500 may include a keyboard, a mouse, and the like, and may further include a touch apparatus and a microphone.

In this embodiment, the memory 2200 of the vehicle-mounted terminal 2000 is configured to store the computer program, and the computer program is used to control the processor 2100 to perform operations to implement a media control method according to any embodiment. The computer program may be configured according to a solution disclosed in this specification.

FIG. 2 shows multiple apparatuses of the vehicle-mounted terminal 2000. The vehicle-mounted terminal 2000 in this embodiment of the present disclosure may include only a part of the apparatuses, or may further include another apparatus. This is not limited herein.

Figure 3:
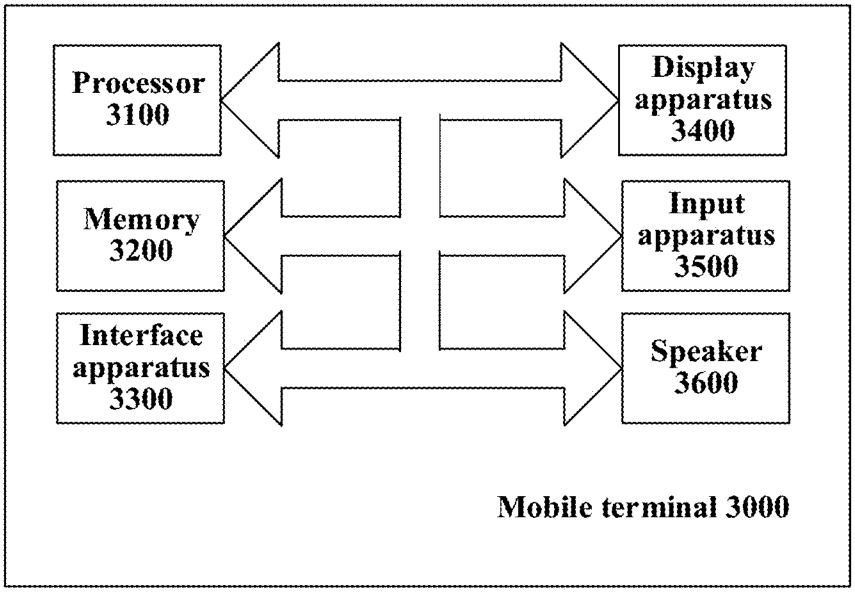
FIG. 3 is a diagram of a structure of a hardware configuration of a mobile terminal that can be used to implement an embodiment.

FIG. 3 is a diagram of a structure of a hardware configuration of a mobile terminal 3000 to which a media control method in embodiments of the present disclosure is applicable.

As shown in FIG. 3, the mobile terminal 3000 may include a processor 3100, a memory 3200, an interface apparatus 3300, a display apparatus 3400, an input apparatus 3500, a speaker 3600, and the like. The processor 3100 is configured to execute a computer program. The computer program may use an instruction set of an architecture, for example, x86, Arm, RISC, MIPS, or SSE. The memory 3200 includes, for example, a ROM (read-only memory), a RAM (random access memory), and a non-volatile memory such as a hard disk. The interface apparatus 3300 is a physical interface, for example, a USB interface or a headset jack. The display apparatus 3400 may be a display, and the display may be a touchscreen. The input apparatus 3500 may include a keyboard, a mouse, and the like, and may further include a touch apparatus and a microphone.

In this embodiment, the memory 3200 of the mobile terminal 3000 is configured to store the computer program, and the computer program is used to control the processor 3100 to perform operations to implement a media control method according to any embodiment. The computer program may be configured according to a solution disclosed in this specification.

FIG. 3 shows multiple apparatuses of the mobile terminal 3000. The mobile terminal 3000 in this embodiment of the present disclosure may include only a part of the apparatuses, or may further include another apparatus. This is not limited herein.

Figure 4:
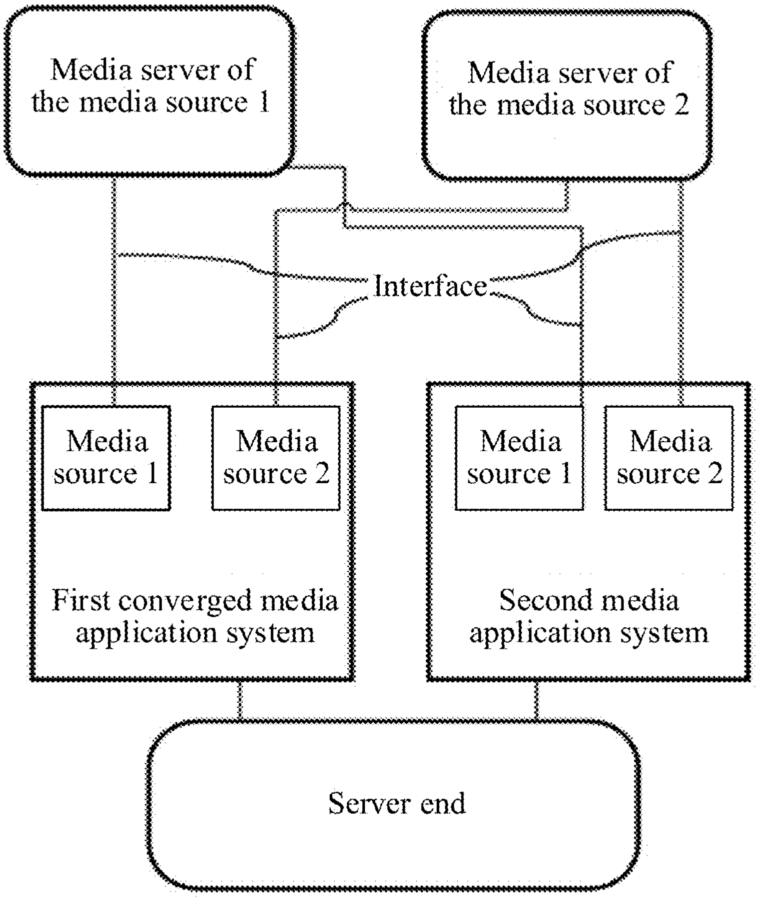
FIG. 4 is a schematic diagram of an application scenario of a media control method according to an embodiment.

FIG. 4 shows an application scenario of a media control method according to an embodiment of the present disclosure.

A first converged media application system is installed on a vehicle-mounted terminal, and interfaces of multiple media sources are integrated in the first converged media application system.

A second media application system is installed on a mobile terminal, and the mobile terminal may be, for example, a mobile phone, a tablet, or another mobile device. This is not limited herein. In an example, the second media application system is also a converged media system. In other words, interfaces of multiple media sources are integrated in the second media application system.

In this embodiment of the present disclosure, the interface of the media source is an SDK (Software Development Kit) interface or an API (Application Programming Interface). In an embodiment, API and SDK interfaces are interfaces for implementing application functions. The target interface in the foregoing content may be an SDK interface or an API, which is not limited herein.

In this application scenario, a converged media application system may interact with a media server corresponding to a media source integrated in the converged media application system through an interface of the media source. In other words, the first converged media application system and the second media application system may separately interact with media servers of media sources.

In this application scenario, a server end is a server end corresponding to the first converged media application system and the second media application system, and provides service support for the first converged media application system and the second media application system.

FIG. 4 shows an example of a media source 1 and a media source 2. However, this embodiment of the present disclosure is not limited thereto, and a quantity of media sources may be set according to an actual situation.

Figure 1:
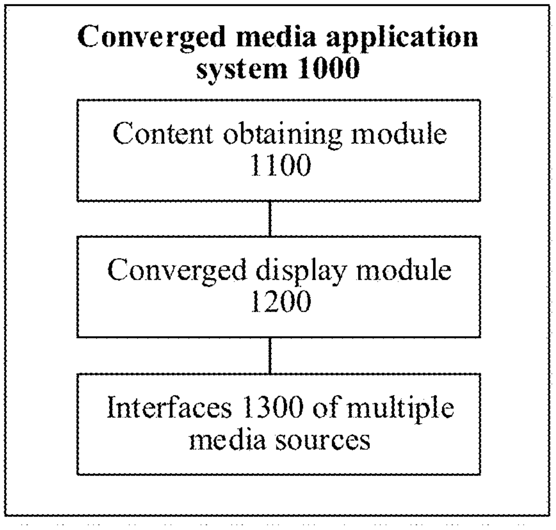
FIG. 1 is a schematic diagram of a converged media application system that can be used to implement an embodiment.

As shown in FIG. 1, an embodiment of the present disclosure provides a converged media application system 1000. With reference to FIG. 1, the converged media application system 1000 includes a content obtaining module 1100, a converged display module 1200, and interfaces 1300 of multiple media sources.

The content obtaining module 1100 is configured to obtain content from servers of the media sources through the interfaces 1300 of the media sources. The converged display module 1200 is configured to display the content obtained by the content obtaining module.

The converged media application system 1000 may be a first converged media application system or a second media application system.

It should be noted that although several modules or units of a system configured to perform actions are mentioned in the foregoing detailed descriptions, such division is not mandatory. According to implementations of the present disclosure, features and functions of two or more modules or units described above may be implemented in one module or unit. Features and functions of one module or unit described above may be further divided to be implemented by multiple modules or units.

Figure 5:
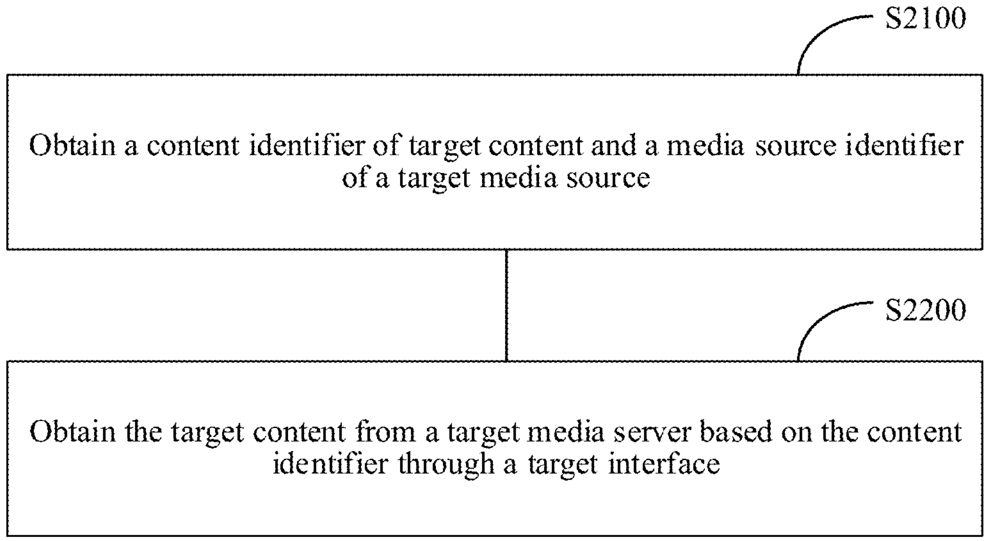
FIG. 5 is a schematic flowchart of a media control method according to an embodiment.

As shown in FIG. 5, an embodiment of the present disclosure provides a media control method. The media control method may be applied to a first converged media application system. For example, the media control method may be implemented by the vehicle-mounted terminal 2000 shown in FIG. 2.

The media control method may include the following steps S2100 and S2200.

Step S2100: A content identifier of target content and a media source identifier of a target media source are obtained. The target media source is a media source of the target content.

After the target content is determined, the content identifier of the target content and the media source of the target content may be learned of. The media source of the target content is the target media source.

In this embodiment of the present disclosure, the content identifier of the target content is used to mark the target content. Each piece of target content corresponds to a different content identifier. The content identifier of the target content may be a string or a data address corresponding to the target content. The content identifier of the target content may be information such as an address of the target content, a name of the target content, and an author of the target content.

Step S2200: The target content is obtained from a target media server based on the content identifier through a target interface. The target interface is an interface corresponding to the media source identifier, and the target media server is a media server of the target media source.

The first converged media application system transmits the content identifier of the target content to the target media server through the target interface over a network. The target media server searches, based on the content identifier of the target content, a media database corresponding to the target media server to obtain the target content corresponding to the content identifier. The target media server then sends the target content to the first converged media application system through the target interface.

An interface corresponding to the media source identifier of the target media source is the target interface.

The media control method provided in this embodiment of the present disclosure is performed by the first converged media application system installed on the vehicle-mounted terminal. An interface of at least one media source is integrated in the first converged media application system. First, the content identifier of the target content and the media source identifier of the target media source are obtained, and then the target content is obtained from the target media server based on the content identifier through the target interface. The target interface is the interface corresponding to the media source identifier. The target media server is the media server of the target media source. In this manner, the first converged media application system can be used to access different media sources to obtain target content for playback, and media applications corresponding to these media sources do not need to be installed on the vehicle-mounted terminal one by one. In this way, it is convenient for a user to operate, and user experience is improved.

Figure 6:
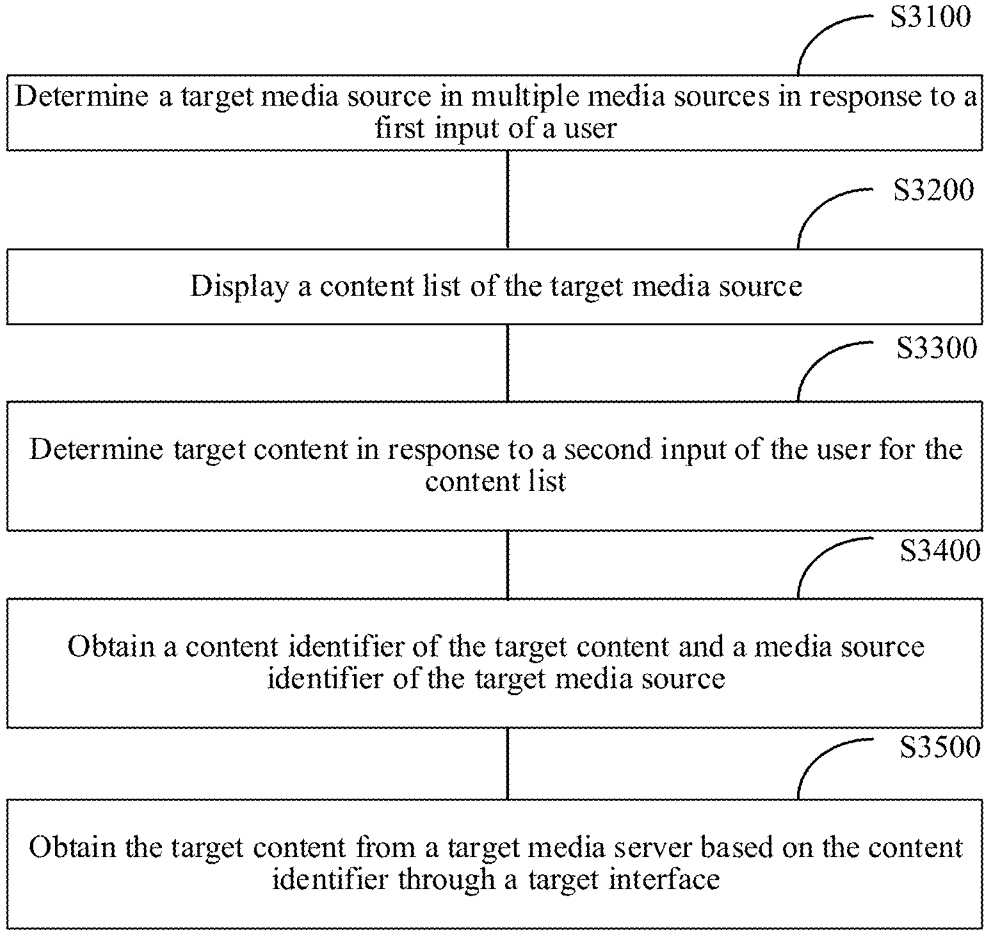
FIG. 6 is a schematic flowchart of a media control method according to another embodiment.

As shown in FIG. 6, an embodiment of the present disclosure further provides a media control method. The media control method may be applied to a first converged media application system. For example, the media control method may be implemented by the vehicle-mounted terminal 2000 shown in FIG. 2.

The media control method may include the following steps S3100 to S3500.

Step S3100: A target media source is determined in multiple media sources in response to a first input of a user.

In this embodiment of the present disclosure, the first converged media application system may display all media sources. The user completes the first input on a touchscreen. The first input may be an input of the user using gesture touch, or may be an input of the user using voice control. The first input may be performing selection from the multiple media sources, to obtain the target media source that matches a user requirement. The target media source includes a media source identifier. The media source identifier is used to mark the target media source. For the first input of the user, one or more media sources may be determined in the multiple media sources. This is not limited herein.

Step S3200: A content list of the target media source is displayed.

In this embodiment of the present disclosure, the first converged media application system switches a media source to the target media source in response to the first input of the user. The content list in the target media source is displayed on the display apparatus 2400 of the vehicle-mounted terminal 2000. The content list is a hot song or station list automatically pushed in the target media source, or may be a song or station list recommended based on a user history record or an individual preference. Display content of the content list may be set according to an actual situation. This is not limited herein.

Figure 11:
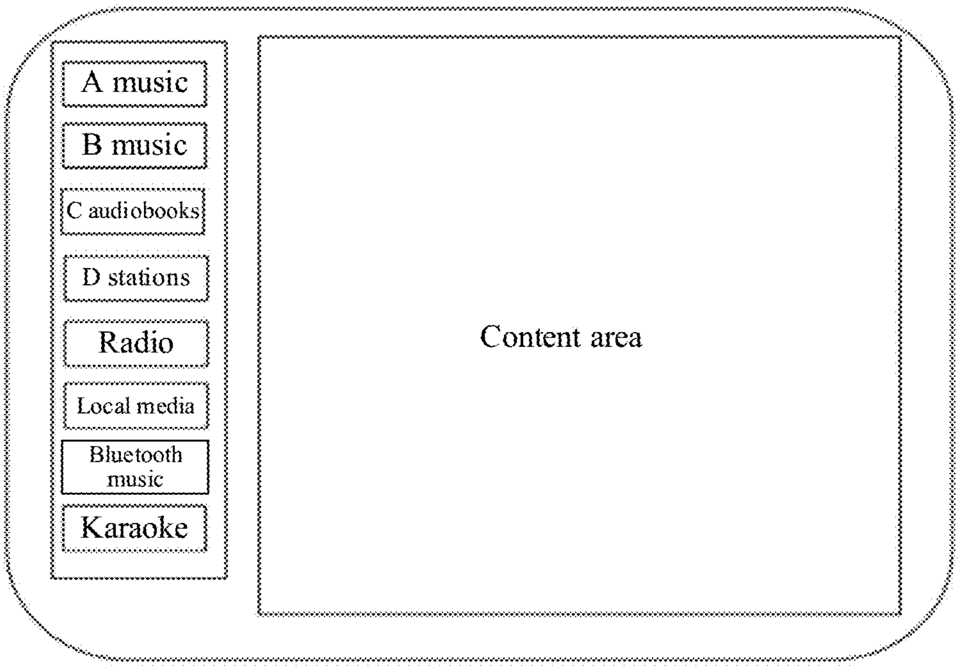
FIG. 11 is a schematic diagram of an interface of a first converged media application system according to an embodiment.

With reference to FIG. 11, multiple media sources are displayed on the left side of an interface of the first converged media application system, and a content area is displayed on the right side of the interface. When the user selects one of the media sources, the media source switches to the selected target media source, and the content area displays a content list in the target media source. The content list is a hot song or station list automatically pushed in the target media source.

Step S3300: Target content is determined in response to a second input of the user for the content list.

In step S3300, the user selects, from the content list of the target media source, a song or a station that has been loaded, that is, performs the second input. The first converged media application system determines, based on the second input of the user, the target content selected based on the second input. The target content includes a content identifier. The content identifier may be used to mark the target content. Each piece of target content corresponds to a different content mark, and the content identifier may be a string or a data address corresponding to the target content.

Step S3400: The content identifier of the target content and the media source identifier of the target media source are obtained. The target media source is a media source of the target content.

In step S3400, the content identifier corresponding to the target content determined in the foregoing content may be obtained based on the target content. Then, the corresponding media source identifier may be obtained based on the determined target media source. The media source corresponding to the target content is the target media source.

Step S3500: The target content is obtained from a target media server based on the content identifier through a target interface. The target interface is an interface corresponding to the media source identifier, and the target media server is a media server of the target media source.

In step S3500, the target media source transmits the content identifier of the target content to the target media server through the target interface over a network. The target media server may search, based on the content identifier, a media database corresponding to the target media server to obtain the target content corresponding to the content identifier. The target media server may transmit the target content to the first converged media application system through the target interface, and the target media source plays the transmitted target content.

The target content transmitted by the target media server to the target media source includes an audio data file corresponding to the target content. The audio data file may be directly played in the target media source. An interface corresponding to the media source identifier of the target media source may be determined based on the media source identifier as the target interface. Each media source has a media server corresponding to the media source. Each media server is set with a corresponding media database.

Figure 7:
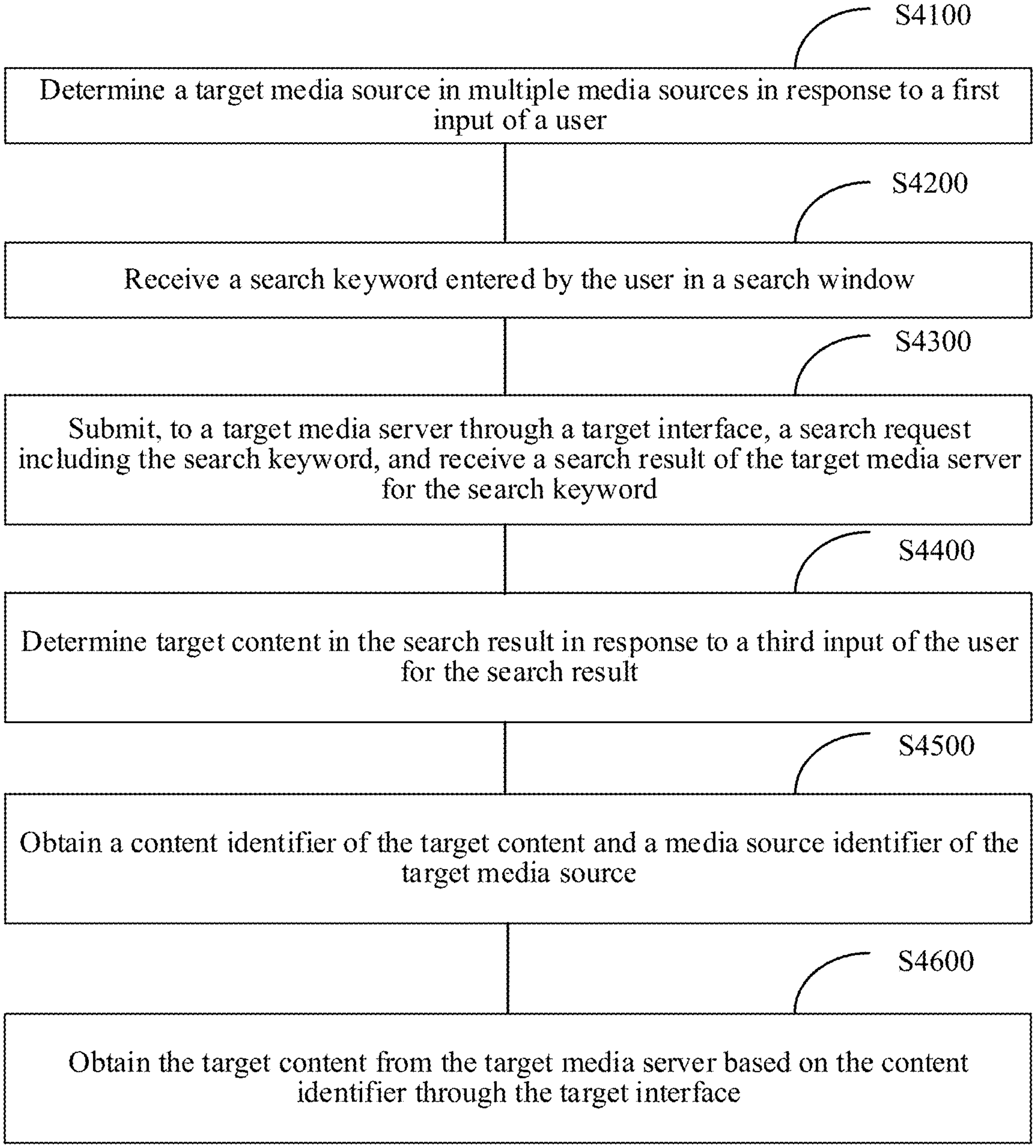
FIG. 7 is a schematic flowchart of a media control method according to another embodiment.

As shown in FIG. 7, an embodiment of the present disclosure further provides a media control method. The media control method may be applied to a first converged media application system. For example, the media control method may be implemented by the vehicle-mounted terminal 2000 shown in FIG. 2.

The media control method may include the following steps S4100 to S4600.

Step S4100: A target media source is determined in multiple media sources in response to a first input of a user.

In this embodiment of the present disclosure, the first converged media application system may display all media sources. The user completes the first input on a touchscreen. The first input may be an input of the user using gesture touch, or may be an input of the user using voice control. The first input may be performing selection from the multiple media sources, to obtain the target media source that matches a user requirement. The target media source includes a media source identifier. The media source identifier is used to mark the target media source. For the first input of the user, one or more media sources may be determined in the multiple media sources. This is not limited herein.

Step S4200: A search keyword entered by the user in a search window is received.

In step S4200, the user may enter the search keyword in a search window corresponding to the target media source. The search keyword may be a combination of Chinese, English, or a number, or another language and symbol. This is not limited herein.

Step S4300: A search request including the search keyword is submitted to a target media server through a target interface, and a search result of the target media server for the search keyword is received.

In step S4300, the target media source submits to the corresponding target media server through the target interface the search request including the search keyword, and transmits the search keyword to the target media server over a network. The target media server searches, based on the search keyword, a media database corresponding to the target media server to obtain the search result corresponding to the search keyword. Target content may be one or more search results that match the keyword. If there is no matched search result, no search result is returned, and no search result is displayed in the target media source. If there are one or more matched search results, the target media server transmits the search result to the target media source of the first converged media application system through the target interface. The target media source receives the found search result, and displays the search result on an interface of the target media source. For a display sequence of search results on the target media source, the search results may be sequentially sorted based on matching degrees between the search results and the keyword, or may be sequentially sorted based on byte lengths of the search results. This is not limited herein.

Step S4400: The target content is determined in the search result in response to a third input of the user for the search result.

In step S4400, the user performs selection from the search result displayed in the target media source, that is, performs the third input. The target media source determines the target content in the search result based on the third input of the user. There may be one or more pieces of target content determined based on the third input. This is not limited herein.

Step S4500: A content identifier of the target content and the media source identifier of the target media source are obtained. The target media source is a media source of the target content.

In step S4500, the content identifier corresponding to the target content determined in the foregoing content may be obtained based on the target content. The corresponding media source identifier may be obtained based on the target media source determined in step S4100. The media source corresponding to the target content is the target media source. Step Step S4600: The target content is obtained from the target media server based on the content identifier through the target interface. The target interface is an interface corresponding to the media source identifier, and the target media server is a media server of the target media source.

In step S4600, the target media source transmits the content identifier of the target content to the target media server through the target interface over a network. The target media server may search, based on the content identifier, a media database corresponding to the target media server to obtain the target content corresponding to the content identifier. The target media server may transmit the target content to the first converged media application system through the target interface, and the target media source plays the transmitted target content.

The target content transmitted by the target media server to the target media source includes an audio data file corresponding to the target content. The audio data file may be directly played in the target media source. An interface corresponding to the media source identifier of the target media source may be determined based on the media source identifier as the target interface. Each media source has a media server corresponding to the media source. Each media server is set with a corresponding media database.

Figure 8:
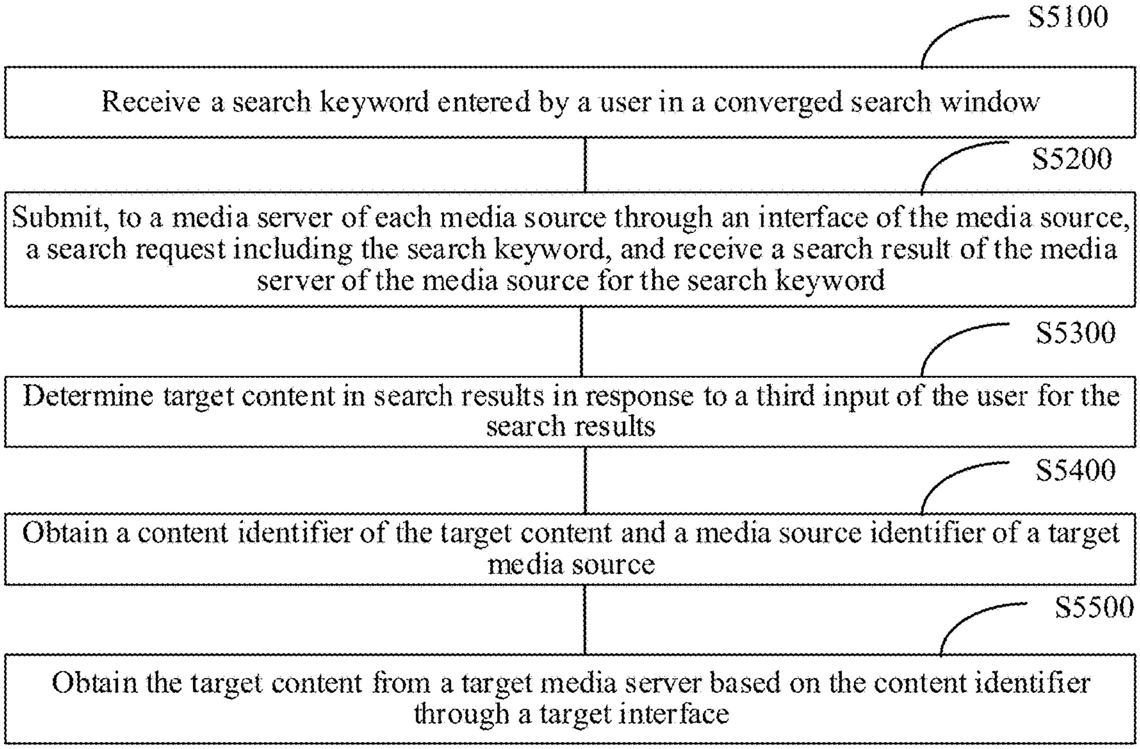
FIG. 8 is a schematic flowchart of a media control method according to another embodiment.

As shown in FIG. 8, an embodiment of the present disclosure further provides a media control method. The media control method may be applied to a first converged media application system. For example, the media control method may be implemented by the vehicle-mounted terminal 2000 shown in FIG. 2.

The media control method may include the following steps S5100 to S5500.

Step S5100: A search keyword entered by a user in a converged search window is received.

In step S5100, the user may enter the search keyword in the converged search window. The search keyword may be a combination of Chinese, English, or a number, or another language and symbol. This is not limited herein.

Step S5200: A search request including the search keyword is submitted to a media server of each media source through an interface of the media source, and a search result of the media server of the media source for the search keyword is received.

In step S5200, the search request for the search keyword is initiated to the media server corresponding to each media source through a target interface corresponding to the media source, and the search keyword is transmitted to a target media server of the media source over a network. The target media server searches, based on the search keyword, a media database corresponding to the target media server to obtain the search result corresponding to the search keyword. There may be one or more search results that match the search keyword. If there is no matched search result, no search result is returned, and no matched search result is displayed on a converged search interface. If there are one or more matched search results, the target media server transmits the search result to the first converged media application system through the target interface. The first converged media application system receives the found search result, and displays the search result on the converged search interface of the first converged media application. For a display sequence of search results on the converged search interface, the search results may be sequentially sorted based on matching degrees between the search results and the keyword, or may be sequentially sorted based on byte lengths of the search results. This is not limited herein.

Step S5300: Target content is determined in the search results in response to a third input of the user for the search results.

In step S5300, the user performs selection from the search results displayed on the converged search interface, that is, performs the third input. A selected search result is used as the target content based on the third input of the user. There may be one or more pieces of target content determined based on the third input. This is not limited herein. Because the search results are obtained by multiple media sources by separately performing searching based on the search keyword, when the target content is determined, a media source corresponding to the target content is determined as a target media source.

Step S5400: A content identifier of the target content and a media source identifier of the target media source are obtained. The target media source is a media source of the target content.

In step S5400, the content identifier corresponding to the target content may be obtained based on the target content. The media source identifier corresponding to the target media source may be obtained based on the target media source determined in step S5300, and an interface corresponding to the media source identifier may be determined as a target interface.

Step S5500: The target content is obtained from a target media server based on the content identifier through the target interface. The target interface is the interface corresponding to the media source identifier, and the target media server is a media server of the target media source.

In step S5500, the target media source transmits the content identifier of the target content to the target media server through the target interface over a network. The target media server may search, based on the content identifier, a media database corresponding to the target media server to obtain the target content corresponding to the content identifier. The target media server may transmit the target content to the first converged media application system through the target interface, and the target media source plays the transmitted target content.

The target content transmitted by the target media server to the target media source includes an audio data file corresponding to the target content. The audio data file may be directly played in the target media source. The interface corresponding to the media source identifier of the target media source may be determined based on the media source identifier as the target interface. Each media source has a media server corresponding to the media source. Each media server is set with a corresponding media database.

Figure 9:
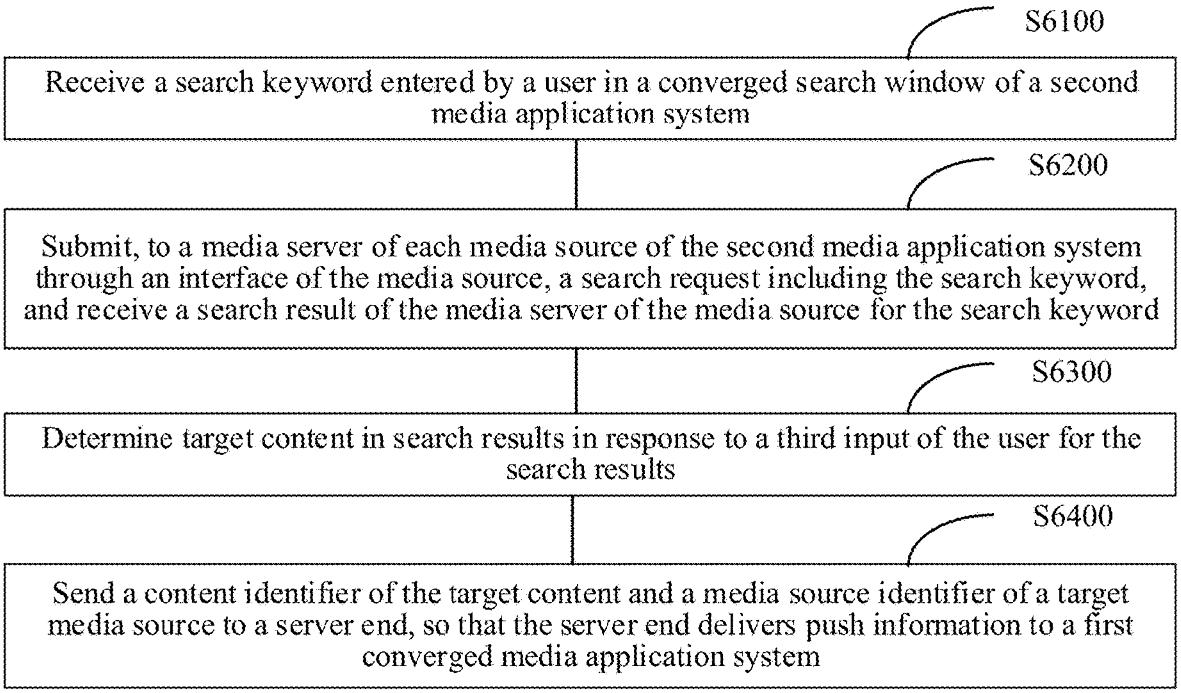
FIG. 9 is a schematic flowchart of a media control method according to another example.

As shown in FIG. 9, an embodiment of the present disclosure further provides a media control method. The media control method may be applied to a second media application system. Interfaces of multiple media sources are integrated in the second media application system. For example, the media control method may be implemented by the mobile terminal 3000 shown in FIG. 3.

The media control method may include the following steps S6100 to S6400.

Step S6100: A search keyword entered by a user in a converged search window of the second application system is received.

Figure 12:
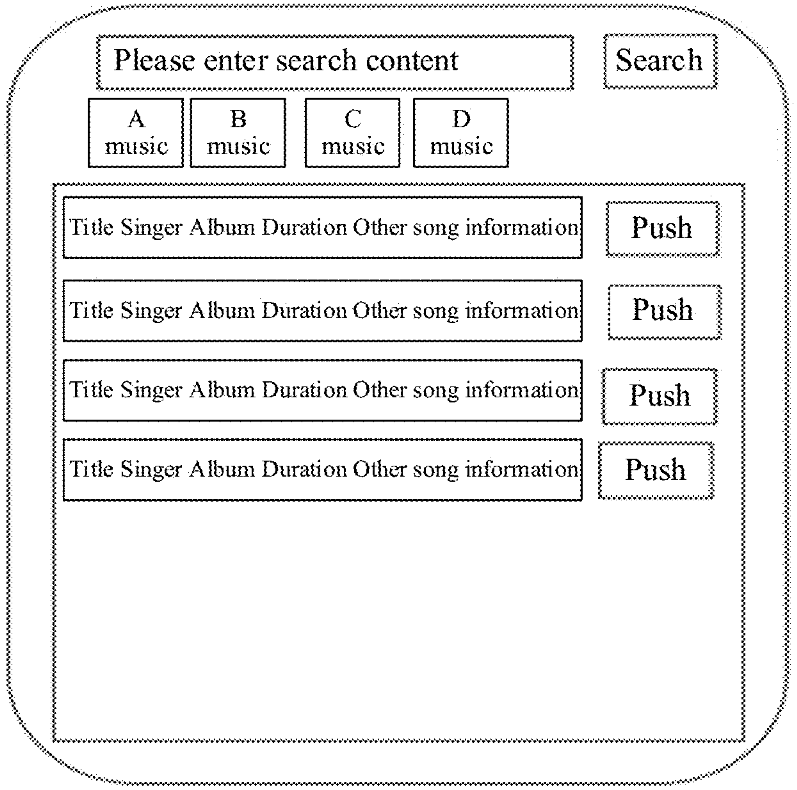
FIG. 12 is a schematic diagram of an interface of a second media application system according to an embodiment.

In step S6100, a first converged media application system is installed on the vehicle-mounted terminal 2000, and the second media application system is installed on a mobile terminal of the user, for example, a mobile phone, a tablet, or another mobile device. This is not limited herein. As shown in FIG. 12, the user enters the search keyword in the converged search window of the second media application system. The search keyword may be a combination of Chinese, English, or a number, or another language and symbol. This is not limited herein.

Step S6200: A search request including the search keyword is submitted to a media server of each media source of the second application system through an interface of the media source, and a search result of the media server of the media source for the search keyword is received.

In step S6200, the second media application system submits to the media server of each media source through a target interface corresponding to the media source the search request including the search keyword, and transmits the search keyword to a target media server of the media source over a network. The target media server searches, based on the search keyword, a media database corresponding to the target media server to obtain the search result corresponding to the search keyword. There may be one or more search results that match the keyword. If there is no matched search result, no target content is returned, and no search result is displayed on a converged search interface. If there are one or more matched search results, the target media server transmits the search result to the second media application system through the target interface, and displays the search result on the converged search interface. For a display sequence of search results on the converged search interface of the second media application system, the search results may be sequentially sorted based on matching degrees between the search results and the keyword, or may be sequentially sorted based on byte lengths of the search results. This is not limited herein.

Step S6300: Target content is determined in the search results in response to a third input of the user for the search results.

In step S6300, the user performs selection from the search results displayed on the converged search interface of the second media application system, that is, performs the third input. A selected search result is determined as the target content based on the third input of the user. Because the search results are obtained by the multiple media sources of the second media application system by separately performing searching based on the search keyword, when the target content is determined, a content identifier of the target content is determined, and a media source corresponding to the target content is also determined as a target media source. Based on the determined the target media source, a media source identifier of the target media source may be determined.

Step S6400: The content identifier of the target content and the media source identifier of the target media source are sent to a server end, so that the server end delivers push information to the first converged media application system.

In step S6400, the second media application system sends the determined content identifier of the target content and the determined media source identifier of the target media source to the server end over a network, and then the server end generates the push information and delivers the push information to the first converged media application system. The push information generated by the server end includes the determined content identifier of the target content and the determined media source identifier of the target media source.

In an embodiment of the present disclosure, the first converged media application system is installed on a vehicle-mounted terminal and the second media application system is installed on a mobile terminal, or the first converged media application system is installed on a mobile terminal and the second media application system is installed on a vehicle-mounted terminal.

In this embodiment of the present disclosure, the first converged media application system may be installed on a vehicle-mounted terminal, and the second media application system is installed on a mobile terminal. In addition, it should be further noted that, in another embodiment of the present disclosure, the first converged media application system may be installed on a mobile terminal, and the second media application system may be installed on a vehicle-mounted terminal. Whether the first converged media application system or the second media application system is installed on a mobile terminal or a vehicle-mounted terminal may be manually set according to an actual situation. This is not limited herein.

Figure 10:
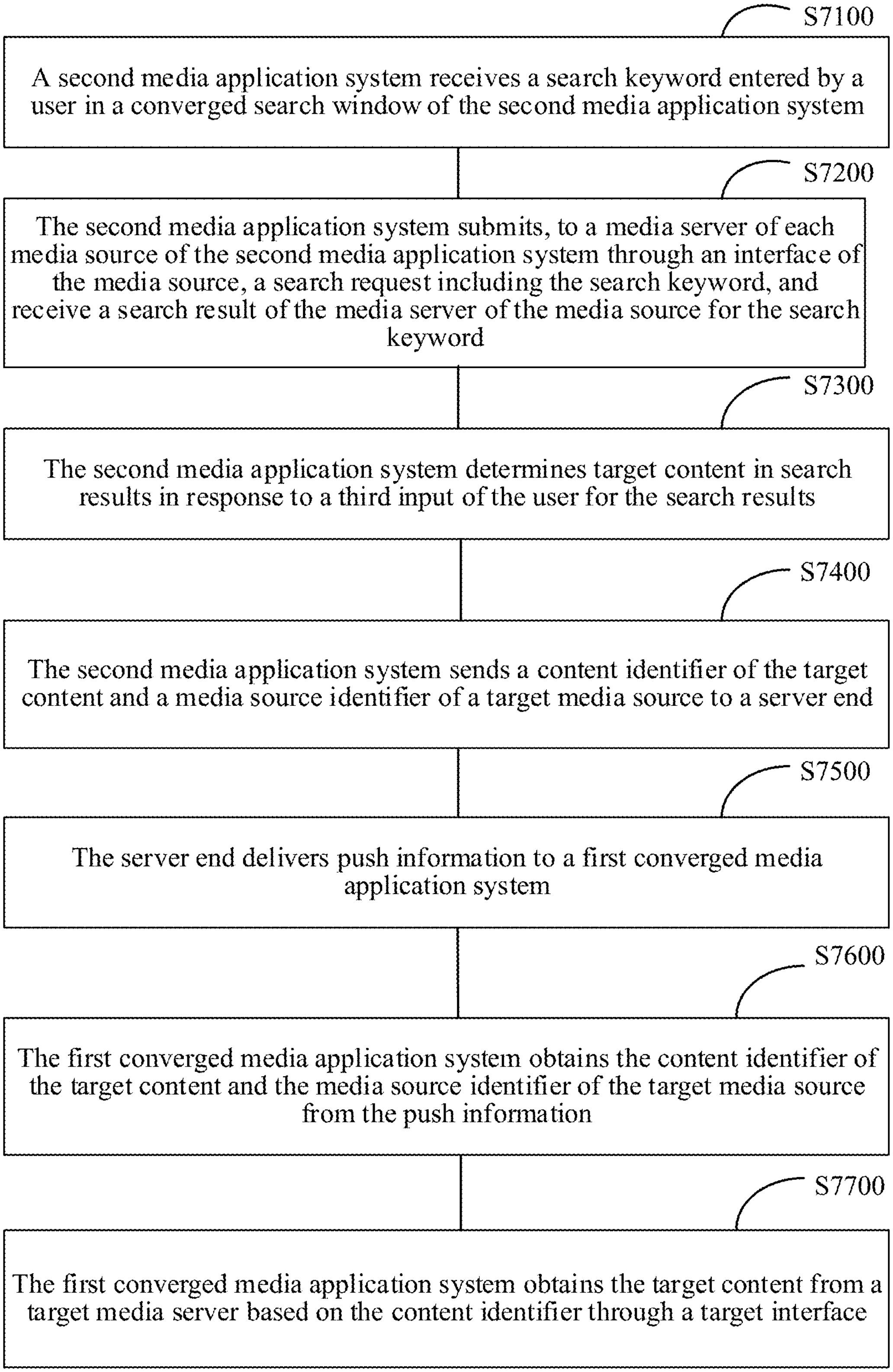
FIG. 10 is a schematic flowchart of a media control method according to another example.

As shown in FIG. 10, an embodiment of the present disclosure further provides a media control method. The media control method may be applied to a media system. The media system includes a first converged media application system, a second media application system, and a server end. The first converged media application system is installed on a vehicle-mounted terminal, the second media application system is installed on a mobile terminal, and interfaces of multiple media sources are integrated in the first converged media application system. In an example, the second media application system may be a converged media system. In other words, interfaces of multiple media sources may be integrated in the second media application system.

The media control method may include the following steps S7100 to S7700.

Step S7100: The second media application system receives a search keyword entered by a user in a converged search window of the second media application system.

In step S7100, the first converged media application system is installed on the vehicle-mounted terminal 2000, and the second media application system is installed on a mobile terminal of the user, for example, a mobile phone, a tablet, or another mobile device. This is not limited herein. As shown in FIG. 12, the user enters the search keyword in the converged search window of the second media application system. The search keyword may be a combination of Chinese, English, or a number, or another language and symbol. This is not limited herein.

Step S7200: The second media application system submits to a media server of each media source of the second media application system through an interface of the media source a search request including the search keyword, and receives a search result of the media server of the media source for the search keyword.

In step S7200, the second media application system submits to the media server of each media source through a target interface corresponding to the media source the search request including the search keyword, and transmits the search keyword to a target media server of the media source over a network. The target media server searches, based on the search keyword, a media database corresponding to the target media server, to obtain the search result corresponding to the search keyword. There may be one or more search results that match the keyword. If there is no matched search result, no target content is returned, and no search result is displayed on a converged search interface. If there are one or more matched search results, the target media server transmits the search result to the second media application system through the target interface, and displays the search result in a column on the converged search interface of the second media application system. As shown in FIG. 12, each column includes information such as a title, a singer, an album, and duration.

For a display sequence of search results on the converged search interface of the second media application system, the search results may be sequentially sorted based on matching degrees between the search results and the keyword, or may be sequentially sorted based on byte lengths of the search results. This is not limited herein.

Step S7300: The second media application system determines target content in the search results in response to a third input of the user for the search results.

In step S7300, the user performs selection from the search results displayed on the converged search interface of the second media application system, that is, performs the third input. A selected search result is determined as the target content based on the third input of the user. Because the search results are obtained by the multiple media sources of the second media application system by separately performing searching based on the search keyword, when the target content is determined, a content identifier of the target content is determined, and a media source corresponding to the target content is also determined as a target media source. Based on the determined the target media source, a media source identifier of the target media source may be determined.

Step S7400: The second media application system sends the content identifier of the target content and the media source identifier of the target media source to the server end.

In step S7400, the second media application system sends the determined content identifier of the target content and the determined media source identifier of the target media source to the server end over a network.

In an embodiment of the present disclosure, push information is generated by the server end based on the content identifier of the target content and the media source identifier of the target media source that are submitted by the second media application system to which a target account is logged in. The first converged media application system is installed on the vehicle-mounted terminal, and the second media application system is installed on the mobile terminal.

The server end receives the content identifier of the target content and the media source identifier of the target media source that are sent by the second media application system. The server generates the push information based on the content identifier of the target content and the media source identifier of the target media source. It should be noted that the first converged media application system may be installed on a vehicle-mounted terminal, and the second media application system may be installed on a mobile terminal. In addition, it should be further noted that, in another embodiment of the present disclosure, the first converged media application system may be installed on a mobile terminal, and the second media application system may be installed on a vehicle-mounted terminal.

It should be noted that before the second media application system uploads the content identifier of the target content and the media source identifier of the target media source, the target account needs to be logged into the second media application system, and a logged-in state is that the target account is logged in on the second media application system. The target account may be obtained by the user through self-registration or in another manner. In addition, it should be noted that the target account logged into the second media application system needs to be consistent with an account logged into the first converged media application system, or the target account logged into the second media application system may be an associated sub-account of the account logged into the first converged media application system.

Step S7500: The server end delivers the push information to the first converged media application system.

In this embodiment of the present disclosure, the server end delivers the generated push information to the first converged media application system. The push information generated by the server end includes the content identifier of the target content and the media source identifier of the target media source.

If the user logs into an in-vehicle infotainment system of the vehicle-mounted terminal or the in-vehicle infotainment system is in a normal working mode, the first converged media application system may directly receive the push information under the target account that is sent by the server end. If the in-vehicle infotainment system is in a sleep or power-off state, when the in-vehicle infotainment system is powered on, the first converged media application system may automatically receive push information delivered by a target media server.

Step S7600: The first converged media application system obtains the content identifier of the target content and the media source identifier of the target media source from the push information.

In step S7600, the first converged media application system obtains the content identifier of the target content and the media source identifier of the target media source from the received push information. After the media identifier of the target media source is obtained, an interface corresponding to the media source identifier of the target media source may be determined, and the interface is used as a target interface.

It should be noted that, after the user logs into the first converged media application system with the target account, the first converged media application system may receive the push information under the target account that is sent by the server end.

If the user logs into the in-vehicle infotainment system or the in-vehicle infotainment system is in the normal working mode, the target account on the first converged media application system is in the logged-in state, and the first converged media application system may directly receive the push information under the target account that is sent by the server end. If the in-vehicle infotainment system of the vehicle-mounted terminal is in the sleep or power-off state, when the in-vehicle infotainment system of the vehicle-mounted terminal is powered on, the target account is automatically logged into the first converged media application system, and the first converged media application system automatically receives the push information delivered by the server end.

Step S7700: The first converged media application system obtains the target content from a target media server based on the content identifier through the target interface. The target interface is an interface, of the first converged media application system, corresponding to the media source identifier, and the target media server is a media server of the target media source.

In step S7700, the target media source transmits the content identifier of the target content to the target media server through the target interface over a network. The target media server may search, based on the content identifier, a media database corresponding to the target media server to obtain the target content corresponding to the content identifier. The target media server may transmit the target content to the first converged media application system through the target interface, and the target media source plays the transmitted target content.

The target content transmitted by the target media server to the target media source includes an audio data file corresponding to the target content. The audio data file may be directly played in the target media source. The interface corresponding to the media source identifier of the target media source may be determined based on the media source identifier as the target interface. Each media source has a media server corresponding to the media source. Each media server is set with a corresponding media database.

In this embodiment, the user may perform an operation on the mobile terminal, select the target content on the mobile terminal, and push the target content to the server end. Then, the server end delivers the push message to the vehicle-mounted terminal. When the vehicle-mounted terminal is in a normal working state, the push message is obtained in real time. When the vehicle-mounted terminal is in a disabled state, the push message may be automatically obtained when the in-vehicle infotainment system of the vehicle-mounted terminal is powered on. In this way, convenience in user operation is improved.

In an embodiment, as shown in FIG. 4, a media server separately exchanges data with a first converged media application system and a second media application system. The following uses an example to describe a process and a principle of transmitting push information by the second media application system to the first converged media application system in the present disclosure.

First, a same target account is logged into the first converged media application system and the second media application system, and a user may operate in the second media application system. As shown in FIG. 12, multiple media source options such as A music, B music, C music, and D music are separately set below the search window. A search keyword is entered in the converged search window, and a search button is clicked, to transmit the search keyword to a target media server of each media source through a target interface corresponding to the media source over a network. The target media server searches, based on the search keyword, a media database in a memory of the target media server to obtain a search result corresponding to the keyword. There may be one or more search results that match the search keyword. If there is no matched search result, there is no need to return target content, and no matched search result is displayed on a converged search interface of the second media application system. With reference to FIG. 12, if there is a matched search result, after the target media server returns the search to a mobile terminal through the target interface, the mobile terminal displays the search result in a column on the converged search interface of the second media application system. As shown in FIG. 12, each column includes information such as a title, a singer, an album, and duration.

It should be noted that before the user enters the search keyword in the search window of the second media application system and clicks the search button, the user may perform selection from the multiple media sources in the second media application system. If the user selects only a few of the options, for example, selects only A music and B music, the search keyword is separately transmitted, over networks, to target media servers corresponding to the two media sources through target interfaces corresponding to the two media sources for searching. If the user does not perform selection, all the media sources are selected by default. In this case, the search keyword is separately transmitted, over the network, to the target media server of each media source through the target interface corresponding to the media source for searching. A quantity of media sources selected by the user is not limited herein, and the quantity is determined based on usage of the user. In this way, searching can be performed based on a requirement of the user, so that traffic is saved and user experience is greatly improved.

Further, the user performs selection from search results displayed in the second media application system, and a selected search result is target content. In this case, a content identifier of the target content and a media source identifier of a target media source may be sent to a server end by clicking a push button corresponding to the selected search result. It should be noted that when the target content is determined, the target media source is also determined, so that the content identifier of the target content and the media source identifier of the target media source can be determined. A target interface corresponding to the media source identifier may be determined based on the media source identifier.

The second media application system sends the content identifier and the media source identifier of the target media source to the server end through the target interface over a network. The server end generates push information based on the uploaded content identifier of the target content and the uploaded media source identifier of the target media source. The server end then transmits the push information to the first converged media application system over a network. The push information includes the content identifier of the target content and the media source identifier of the target media source.

If the user logs into an in-vehicle infotainment system, the in-vehicle infotainment system is in a normal working mode, and the target account is already logged in, the first converged media application system directly receives the push information sent by the server end. If the in-vehicle infotainment system is in a sleep or power-off state, when the in-vehicle infotainment system of a vehicle-mounted terminal is powered on, the target account is automatically logged into the first converged media application system, and the first converged media application system receives the push information delivered by the server end.

Finally, the first converged media application system automatically receives the push information from the server end. The push information includes the content identifier of the target content and the media source identifier of the target media source. The content identifier is transmitted to a target media server through the target interface corresponding to the media source identifier over a network. The target media server searches, based on the content identifier, a media database corresponding to the target media server to obtain the target content corresponding to the content identifier. The target media server transmits the target content to the target media source through the target interface, and plays the target content. The target content transmitted by the target media server to the target media source in the first converged media application system includes a corresponding audio data file, and the audio data file may be directly played in the target media source.

Figure 13:
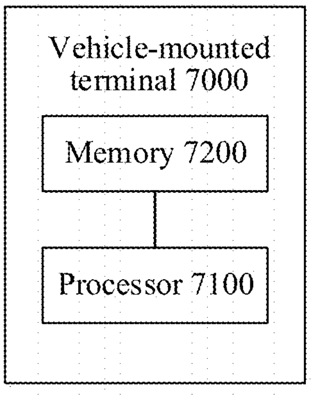
FIG. 13 is a schematic diagram of a vehicle-mounted terminal according to an embodiment.

In an embodiment, embodiments of the present disclosure further provide a vehicle-mounted terminal 7000. As shown in FIG. 13, the vehicle-mounted terminal 7000 may include a processor 7100 and a memory 7200. The memory 7200 stores computer instructions. When the computer instructions are run by the processor 7100, steps performed by the first converged media application system in the media control method in any embodiment of the present disclosure are performed.

Figure 14:
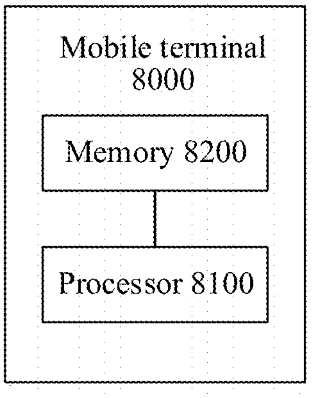
FIG. 14 is a schematic diagram of a mobile terminal according to an embodiment.

In this embodiment, a mobile terminal 8000 is further provided. As shown in FIG. 14, the mobile terminal 8000 may include a processor 8100 and a memory 8200. The memory 8200 stores computer instructions. When the computer instructions are run by the processor 8100, steps performed by the second media application system in the media control method in any embodiment of the present disclosure are performed.

In an embodiment, embodiments of the present disclosure further provide a non-transitory computer-readable storage medium, storing computer instructions. When the computer instructions are run/executed by a processor, the media control method in any method embodiment of the present disclosure is implemented.

In this embodiment, a non-transitory computer-readable storage medium is further provided. The non-transitory computer-readable storage medium stores computer instructions. When the computer instructions are run by a processor, steps performed by the first converged media application system in the media control method in any method embodiment of the present disclosure are implemented.

In this embodiment, a non-transitory computer-readable storage medium is further provided. The non-transitory computer-readable storage medium stores computer instructions. When the computer instructions are run by a processor, steps performed by the second media application system in the media control method in any method embodiment of the present disclosure are implemented.

In an embodiment of the present disclosure further provide a computer program product. When the computer program product runs, steps performed by the first converged media application system in the media control method in any embodiment of the present disclosure or steps performed by the second media application system in the media control method in any embodiment of the present disclosure are implemented.

The present disclosure may be implemented as a system, a method, and/or a computer program product. The computer program product may include a non-transitory computer-readable storage medium that carries computer-readable program instructions used to enable the processor 2100 to implement aspects of the present disclosure.

The non-transitory computer-readable storage medium may be a tangible device that can maintain and store an instruction used by an instruction execution device. The non-transitory computer-readable storage medium may be, for example, but is not limited to, an electric storage device, a magnetic storage device, an optical storage device, an electromagnetic storage device, a semiconductor storage device, or any appropriate combination thereof. More examples (a non-exhaustive list) of the non-transitory computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disc (DVD), a memory stick, a floppy disk, a mechanical coding device, for example, a punch card or a protrusion structure in a groove that stores instructions, and any appropriate combination thereof. The non-transitory computer-readable storage medium used herein is not interpreted as an instantaneous signal, for example, a radio wave or another freely propagating electromagnetic wave, an electromagnetic wave propagated through a waveguide or another transmission medium (for example, an optical pulse propagated through an optical fiber cable), or an electrical signal transmitted through a wire.

The computer-readable program instructions described herein may be downloaded from the non-transitory computer-readable storage medium to each computing/processing device, or downloaded to an external computer or an external storage device over a network, for example, the Internet, a local area network, a wide area network, and/or a wireless network. The network may include copper transmission cables, optical fiber transmission, wireless transmission, routers, firewalls, switches, gateway computers, and/or edge servers. A network adapter or a network interface in each computing/processing device receives the computer-readable program instructions from the network, and forwards the computer-readable program instructions, so that the computer-readable program instructions are stored in a non-transitory computer-readable storage medium in each computing/processing device.

Computer program instructions for performing operations of the present disclosure may be assembly instructions, instruction set architecture (ISA) instructions, machine instructions, machine-related instructions, microcode, firmware instructions, status setting data, or source or target code written in one programming language or any combination of multiple programming languages. The programming languages include an object-oriented programming language, for example, Smalltalk or C++, and a conventional procedural programming language, for example, C language or a similar programming language. The computer-readable program instructions may be completely executed on a user computer, partially executed on a user computer, executed as an independent software package, partially executed on a user computer and partially executed on a remote computer, or completely executed on a remote computer or server. In a case involving a remote computer, the remote computer may be connected to a user computer through any type of network including a local area network (LAN) or a wide area network (WAN), or may be connected to an external computer (for example, through the Internet by using an Internet service provider). In some embodiments, an electronic circuit, for example, a programmable logic circuit, a field programmable gate array (FPGA), or a programmable logic array (PLA), is personalized by using status information of the compute-readable program instructions, so that the electronic circuit may execute the computer-readable program instructions to implement aspects of the present disclosure.

The aspects of the present disclosure are described with reference to flowcharts and/or block diagrams of methods, apparatuses (systems), and computer program products according to embodiments of the present disclosure. It should be understood that each block in the flowcharts and/or block diagrams and a combination of blocks in the flowcharts and/or block diagrams can be implemented by computer-readable program instructions.

These computer-readable program instructions may be provided to a processor of a general-purpose computer, a dedicated computer, or another programmable data processing apparatus to generate a machine, so that these instructions generate, when being executed by the processor of the computer or another programmable data processing apparatus, an apparatus for implementing functions/actions specified in one or more blocks in the flowcharts and/or block diagrams. These computer-readable program instructions may be stored in a non-transitory computer-readable storage medium. These instructions enable a computer, a programmable data processing apparatus, and/or another device to work in a manner, so that the non-transitory computer-readable storage medium storing the instructions includes an artifact, including the instructions for implementing aspects of functions/actions specified in one or more blocks in the flowcharts and/or block diagrams.

The computer-readable program instructions may be loaded onto a computer, another programmable data processing apparatus, or another device, so that a series of operational steps are performed on the computer, another programmable data processing apparatus, or another device, thereby generating a computer-implemented process. Therefore, the instructions executed on the computer, another programmable data processing apparatus, another device implement functions/actions specified in one or more blocks in the flowcharts and/or block diagrams.

The flowcharts and block diagrams in the accompanying drawings illustrate architectures, functions, and operations of possible implementations of systems, methods, and computer program products according to multiple embodiments of the present disclosure. In this regard, each block in the flowcharts or block diagrams may represent a module, a program segment, or a part of instructions. The module, the program segment, or the part of instructions includes one or more executable instructions for implementing a specified logic function. In some implementations used as substitutes, functions annotated in blocks may occur in a sequence different from that annotated in the accompanying drawings. For example, actually two blocks shown in succession may be performed basically in parallel, but sometimes the two blocks may be performed in a reverse sequence. This is determined based on related functions. It should be further noted that, each block in the block diagrams and/or flowcharts and a combination of blocks in the block diagrams and/or flowcharts may be implemented by using a dedicated hardware-based system configured to perform a specified function or action, or may be implemented by using a combination of dedicated hardware and computer instructions. It is well-known to a person skilled in the art that implementation in a hardware manner, implementation in a software manner, and implementation in a combination of software and hardware are equivalent.

The embodiments of the present disclosure are described above. The foregoing descriptions are examples, are not exhaustive, and are not limited to the disclosed embodiments. Many modifications and variations are clear to a person of ordinary skill in the art without departing from the scope and spirit of the described embodiments. Selection of terms used in this specification is intended to best explain embodiment principles, actual application, or improvements to technologies in the market, or to enable another person of ordinary skill in the art to understand the embodiments disclosed in this specification. The scope of the present disclosure is limited by the appended claims.

What is claimed is:

1. A media control method, applied to a first converged media application system installed on a vehicle-mounted terminal having an in-vehicle infotainment system, wherein interfaces of multiple media sources are integrated in the first converged media application system, and the method comprises:

receiving a first input of a user via a user interface, determining a target media source from the multiple media sources according to the first input, and determining target content from the target media source, obtaining a content identifier of the target content and a media source identifier of the target media source from push information of a target account from a server end after the target account is logged in on a second media application system, wherein the target account logged in on the second media application system is consistent with an account logged in on the first converged media application system or is an associated sub-account thereof, and wherein, when the in-vehicle infotainment system is in a sleep or power-off state at a time the push information is delivered by the server end, the target account is automatically logged in on the first converged media application system upon the in-vehicle infotainment system being powered on, and the push information is automatically received by the first converged media application system from the server end;

obtaining as a target interface, a Software Development Kit (SDK) interface or an Application Programming Interface (API) of the target media source corresponding to the media source identifier obtained from the push information, and obtaining access to a target media server of the target media source through the target interface; and obtaining and playing back the target content from the target media server based on the content identifier through the target interface.

2. The media control method according to claim 1, wherein the determining the target content from the target media source comprises:

displaying a content list comprised in the target media source; and in response to a second input of the user, determining the target content from the content list according to the second input.

3. The media control method according to claim 1, wherein the determining the target content from the target media source comprises:

receiving a search keyword entered by the user in a search window;

submitting, to the target media server through the target interface, a search request comprising the search keyword, and receiving a search result corresponding to the search keyword from the target media server; and in response to a third input of the user, determining the target content in the search result according to the third input.

4. The media control method according to claim 1, wherein the determining the target content from the target media source comprises:

receiving a search keyword entered by the user in a converged search window;

submitting, to a media server of each of the multiple media sources through an interface of each of the multiple media sources, a search request comprising the search keyword, and receiving a search result corresponding to the search keyword from the media server of each of the multiple media sources; and in response to a third input of the user, determining the target content in the search results according to the third input.

5. The media control method according to claim 1, wherein the obtaining a content identifier of the target content and a media source identifier of the target media source comprises sending the target media source and the target content to the second media application system, wherein the content identifier of the target content and the media source identifier of the target media source are determined by the second media application system, and submitted to the server end by the second media application system.

6. The media control method according to claim 1, wherein the push information is generated by the server end based on the content identifier of the target content and the media source identifier of the target media source that are submitted by the second media application system, and the second media application system is installed on a mobile terminal.

7. The media control method according to claim 1, wherein an interface of each of multiple media sources comprises a Software Development Kit (SDK) interface or an Application Programming Interface (API).

8. A media control method, applied to a second media application system installed on a mobile terminal, the method comprising:

sending a content identifier of target content and a media source identifier of a target media source to a server end, for the server end to generate and deliver push information of a target account to a first converged media application system installed on a vehicle-mounted terminal having an in-vehicle infotainment system after the target account is logged in on the second media application system, wherein the target account logged in on the second media application system is consistent with an account logged in on the first converged media application system or is an associated sub-account thereof, wherein interfaces of multiple media sources are integrated in the first converged media application system, the push information comprises the content identifier of the target content and the media source identifier of the target media source, the first converged media application system obtains the target content from a target media server based on the content identifier through a target interface of the first converged media application system, the target interface corresponds to the media source identifier and comprises a Software Development Kit (SDK) interface or an Application Programming Interface (API), and the target media server is a media server of the target media source, and wherein, when the in-vehicle infotainment system is in a sleep or power-off state at a time the push information is delivered, the target account is automatically logged in on the first converged media application system upon the in-vehicle infotainment system being powered on, and the push information is automatically received by the first converged media application system from the server end.

9. The media control method according to claim 8, wherein the interfaces of multiple media sources are integrated in the second media application system; and before the sending a content identifier of target content and a media source identifier of a target media source to a server end, the method further comprises:

receiving a search keyword entered by a user in a converged search window of the second media application system;

submitting, to a media server of each of the multiple media sources of the second media application system through an interface of each of the multiple media sources, a search request comprising the search keyword, and receiving a search result corresponding to the search keyword from the media server of each of the multiple media sources; and in response to a third input of the user, determining the target content in the search results.

10. A media control method comprises:

sending, by a second media application system installed on a mobile terminal, a content identifier of target content and a media source identifier of a target media source to a server end, wherein a target account logged in on the second media application system is consistent with an account logged in on a first converged media application system installed on a vehicle-mounted terminal having an in-vehicle infotainment system, or is an associated sub-account thereof;

delivering, by the server end, push information of the target account after the target account is logged in on the second media application system to the first converged media application system, wherein, when the in-vehicle infotainment system is in a sleep or power-off state at a time the push information is delivered, the target account is automatically logged in on the first converged media application system upon the in-vehicle infotainment system being powered on, and the push information is automatically received by the first converged media application system from the server end;

obtaining, by the first converged media application system, the content identifier of the target content and the media source identifier of the target media source from the push information; and obtaining and playing back, by the first converged media application system, the target content from a target media server based on the content identifier through a target interface, wherein the target interface is of the first converged media application system and corresponds to the media source identifier and comprises a Software Development Kit (SDK) interface or an Application Programming Interface (API), and the target media server is a media server of the target media source.

11. The media control method according to claim 10, wherein the second media application system comprises interfaces of multiple media sources; and before the sending, by the second media application system, a content identifier of target content and a media source identifier of a target media source to the server end, the method further comprises:

receiving, by the second media application system, a search keyword entered by a user in a converged search window of the second media application system;

submitting, by the second media application system to a media server of each of the multiple media sources of the second media application system through an interface of each of the multiple media sources, a search request comprising the search keyword, and receiving a search result corresponding to the search keyword from the media server of each of the multiple media sources; and in response to a third input of the user, determining, by the second media application system, the target content in the search results.

12. A vehicle-mounted terminal, comprising a processor and a memory, the memory storing computer instructions, wherein the processor executes the computer instructions to perform the media control method according to claim 1.

13. The vehicle-mounted terminal according to claim 12, wherein the determining the target content from the target media source comprises:

displaying a content list comprised in the target media source; and in response to a second input of the user, determining the target content from the content list according to the second input.

14. The vehicle-mounted terminal according to claim 12, wherein the determining the target content from the target media source comprises:

receiving a search keyword entered by the user in a search window;

submitting, to the target media server through the target interface, a search request comprising the search keyword, and receiving a search result corresponding to the search keyword from the target media server; and in response to a third input of the user, determining the target content in the search result according to the third input.

15. The vehicle-mounted terminal according to claim 12, wherein the determining the target content from the target media source comprises:

receiving a search keyword entered by the user in a converged search window;

submitting, to a media server of each of the multiple media sources through an interface of each of the multiple media sources, a search request comprising the search keyword, and receiving a search result corresponding to the search keyword from the media server of each of the multiple media sources; and in response to a third input of the user, determining the target content in the search results according to the third input.

16. The vehicle-mounted terminal according to claim 12, wherein the obtaining a content identifier of the target content and a media source identifier of the target media source comprises sending the target media source and the target content to the second media application system, wherein the content identifier of the target content and the media source identifier of the target media source are determined by the second media application system, and submitted to the server end by the second media application system.

17. The vehicle-mounted terminal according to claim 12, wherein the push information is generated by the server end based on the content identifier of the target content and the media source identifier of the target media source that are submitted by the second media application system, and the second media application system is installed on a mobile terminal.

* * * * *